US008156170B2

(12) United States Patent
Enenkel et al.

(10) Patent No.: US 8,156,170 B2
(45) Date of Patent: *Apr. 10, 2012

(54) INCREASED PRECISION IN THE COMPUTATION OF A RECIPROCAL SQUARE ROOT

(75) Inventors: Robert F. Enenkel, Markham (CA); Robert L. Goldiez, Apex, NC (US); T. J. Christopher Ward, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1196 days.

This patent is subject to a terminal disclaimer.

(21) Appl. No.: 11/930,635

(22) Filed: Oct. 31, 2007

(65) Prior Publication Data

US 2008/0052338 A1    Feb. 28, 2008

Related U.S. Application Data

(63) Continuation of application No. 10/632,362, filed on Jul. 31, 2003, now Pat. No. 7,313,584.

(51) Int. Cl.
*G06F 7/38* (2006.01)
(52) U.S. Cl. .......................... 708/500; 708/605
(58) Field of Classification Search .................. 708/500, 708/602, 605
See application file for complete search history.

(56) References Cited

U.S. PATENT DOCUMENTS

| 6,341,300 | B1 | 1/2002 | Shankar et al. | |
| 6,349,319 | B1 | 2/2002 | Shankar et al. | |
| 6,631,391 | B1* | 10/2003 | Inabata et al. | 708/495 |
| 6,963,895 | B1 | 11/2005 | Comstock | |
| 7,117,238 | B1* | 10/2006 | Foskett et al. | 708/502 |
| 7,313,584 | B2* | 12/2007 | Enenkel et al. | 708/605 |
| 2005/0071401 | A1* | 3/2005 | Clifton | 708/290 |

OTHER PUBLICATIONS

Abramowitz & Stegun, "Handbook of Mathematical Functions", 1964, pp. 14, 15, 18.
"IBM PowerPC 440 FPU Brings Supercomputing Into the Embedded Space", IBM PowerPC Processor News, Aug. 2001. http://www-3.ibm.com/chips/products/powerpc/newsletter/aug2001.
IEEE 754, IEEE Standard for Binary Floating-Point Arithmetic, ANSI/IEEE Std 754-1985, IEEE Standard for Binary Floating-Point Arithmetic, IEEE, New York, 1985.

* cited by examiner

*Primary Examiner* — Chuong D Ngo
(74) *Attorney, Agent, or Firm* — Ference & Associates LLC

(57) ABSTRACT

A method and arrangements for increased precision in the computation of a reciprocal square root is disclosed. In accordance with the present invention, it is possible to achieve fifty three (53) bits of precision in less processing time than previously possible.

9 Claims, 5 Drawing Sheets

INCREASED PRECISION IN THE COMPUTATION OF A RECIPROCAL SQUARE ROOT

CROSS REFERENCE TO RELATED APPLICATIONS

This application is a continuation application of U.S. patent application Ser. No. 10/632,362 filed on Jul. 31, 2003 now U.S. Pat. No. 7,313,584, the contents of which are hereby fully incorporated by reference in its entirety.

FIELD OF THE INVENTION

The present invention relates to increased precision for the computation of a reciprocal square root.

BACKGROUND OF THE INVENTION

In microprocessor design, it is not unusual for the designer of the chip to specify that certain functions are to be performed by the chip. The implementation of the specified functions is then left to another designer. Two such functions which are specified for some microprocessors are the square root function 'sqrt(x)' and the reciprocal square root function '1/sqrt(x)'. One microprocessor family for which these functions have been specified and implemented is the IBM PowerPC. Such a microprocessor is used in the IBM Blue Gene/L Supercomputer ("BG/L"). See [http://]www.ibm.com/chips/products.powerpc/newsletter/aug2001/new-prod3.html.

The reciprocal square root function is necessary in a number of calculations used in a variety of applications, however, it generally is used in connection with determining the direction of the vector between any two points in space. By way of example, such a function is used in calculating the direction and magnitude of the force between pairs of atoms when simulating the motion of protein molecules in water solution. The function is also used in calculating the best estimate of the rotation and shift between a pair of images of a triangle, i.e., where the triangle might be defined by 3 points picked out on a digital image, such as an image of a fingerprint; for the purpose of matching a 'candidate' fingerprint in a large set of 'reference' fingerprints.

While the reciprocal square root function may be implemented in a number of ways, there is no standard for its precision. The function should optimally return the double-precision floating point number nearest to the reciprocal of the square root of its argument 'x'. Compare IEEE Standard for Binary Floating-Point Arithmetic (IEEE 754). ANSI/IEEE Std 754-1985, IEEE Standard for Binary Floating-Point Arithmetic, IEEE, New York, 1985. To arrive at such a result, however, requires significant computational resources such as processing time.

In most computational situations, however, it is sufficient to generate an approximation of the reciprocal square root of a number that is precise to some number of bits smaller than the standard fifty three (53) bits. Known implementations of the reciprocal square root function involve a trade-off between precision and computational resources, i.e., processing time.

There thus is a need for a method and system for calculating the reciprocal of a square root of a number that provides for both greater accuracy and greater precision without increasing the need for computing time and resources.

SUMMARY OF THE INVENTION

In accordance with at least one presently preferred embodiment of the present invention there is now broadly contemplated increased precision in the computation of the reciprocal square root of a number One aspect of the present invention provides a method of for calculating the reciprocal square root of a number, comprising the steps of: forming a piecewise-linear estimate for the reciprocal square root of a number; rounding said estimate to a lower precision; computing the residual of said rounded estimate; using a Taylor Expansion to compute the polynomial in said residual of said estimate to obtain the residual error; and multiplying said rounded estimate by said residual error and adding the result to said rounded estimate.

Another aspect of the present invention provides an apparatus for calculating the reciprocal square root of a number, comprising: an arrangement for forming a piecewise-linear estimate for the reciprocal square root of a number; an arrangement for rounding said estimate to a lower precision; an arrangement for computing the residual of said rounded estimate; an arrangement for using a Taylor Expansion to compute the polynomial in said residual of said estimate to obtain the residual error; and an arrangement for multiplying said rounded estimate by said residual error and adding the result to said rounded estimate.

Furthermore, an additional aspect of the present invention provides A program storage device readable by machine, tangibly embodying a program of instructions executable by the machine to perform a method for calculating the reciprocal square root of a number, comprising the steps of: forming a piecewise-linear estimate for the reciprocal square root of a number; rounding said estimate to a lower precision; computing the residual of said rounded estimate; using a Taylor Expansion to compute the polynomial in said residual of said estimate to obtain the residual error; and multiplying said rounded estimate by said residual error and adding the result to said rounded estimate.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
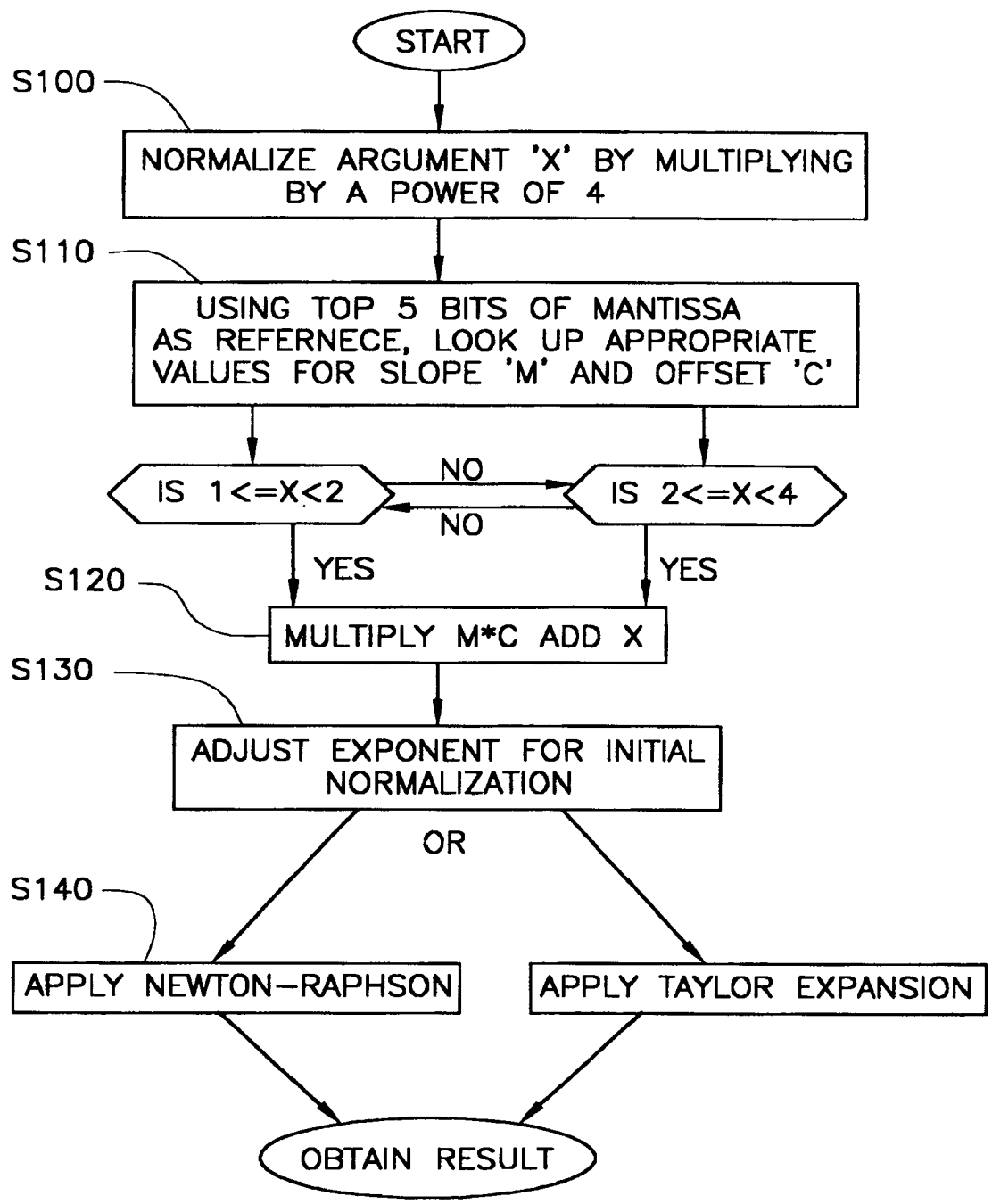
FIG. 1 is a flow diagram of the PowerPC implementation of the process for determining the reciprocal square root of the argument 'X'.

As previously discussed, IBM PowerPC processors all contain a 'reciprocal square root estimate'. Referring now to FIG. 1, a piecewise-linear estimate for the reciprocal square root is formed initially. In this implementation of the function, at S100, the argument is first normalized (multiplied by a power of 4) into a range of 1<=x<4. Next, at S110, the top five bits (after the implied leading '1') of the mantissa are used to index one of two pairs of 32-element tables, depending on whether x is in the range '1<=x2' or in the range '2<=x4'. This results in slope and offset values 'm' and 'c', respectively, appropriate for range 'x'. At S120, The value 'm*x+c' is calculated and, at S130, the exponent is adjusted for the initial normalization. At S140, to get from this estimate to the desired result one of two well-known conventional methods is generally used—the Newton-Raphson Iteration or the Taylor Series Expansion.

Figure 2:
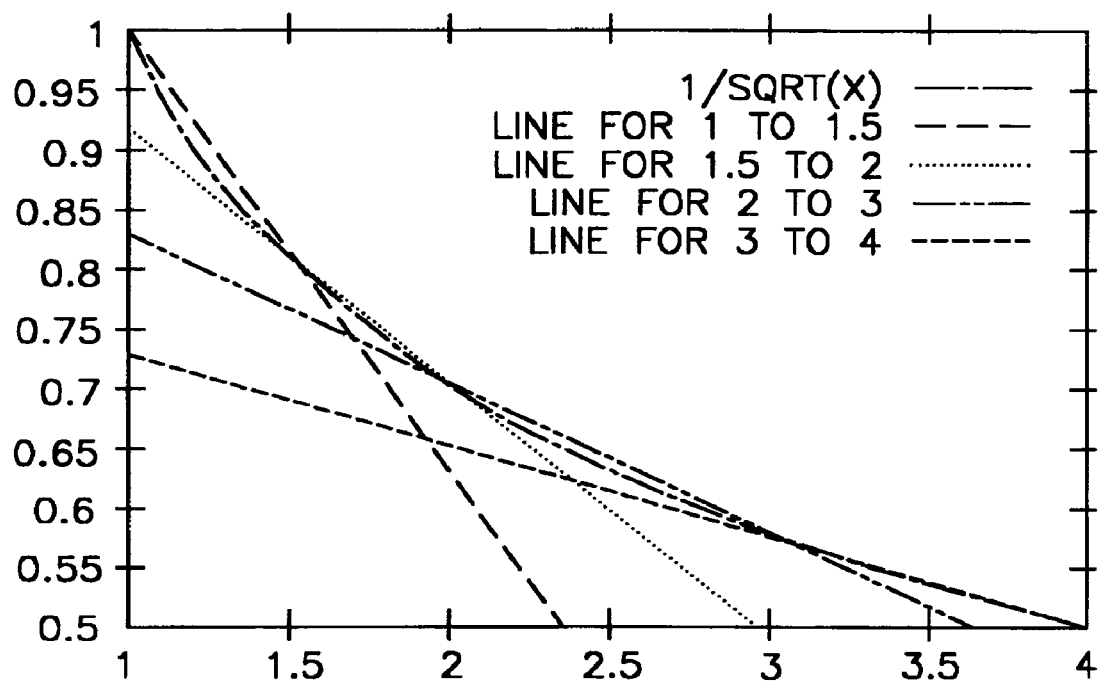
FIG. 2 is a graph diagram of the values returned for the piecewise-linear estimate for the reciprocal square root of a number in the range of 1 to 2 and 2 to 4.

The process of forming a piecewise-linear estimate is described in S100-S130, is discussed below, and is well known in the art. See Abromowitz and Stegun, *Handbook of Mathematical Functions*, (1964). FIG. 2 illustrates the graph diagram for the piecewise-linear estimate for the reciprocal square root of a number in the range of 1 to 2 and 2 to 4. As can be seen, the process of forming the estimate involves splitting the region from 1 to 2 into 2(two) sections and the region from 2 to 4 into 2 (two) sections. The process of rounding causes the graph lines to become staircase progressions instead of the straight lines depicted in FIG. 2. As discussed above, once the piecewise-linear estimate is formed, the estimate is usually adjusted by applying Newton's Method or performing a Taylor Expansion.

The Newton-Raphson iteration (also called "Newton's Method") is well known and is discussed in detail in Abromowitz and Stegun, *Handbook of Mathematical Functions*, (1964), p. 18, which is hereby incorporated by reference. Newton's Method recognizes that the reciprocal square root of 'a' is the solution of the formula $a*x*x-1=0$. The solution is derived through a few iterations of the formula. The Taylor Series is also well known and is also described in particularity in Abromowitz (p. 15), which is also hereby incorporated by reference. In the Taylor Series, the estimate 'x0' of the reciprocal square root is adjusted for more accuracy using an error term 'e' as follows. The equation $a*x0*x0-1$ is solved and a correction term 'epr' is developed solving the equation 'epr= $(1+e)**(-0.5)-1$'. In the result, 'x0+(x0*epr), 'e' will be small (less than $2**-13$ in the BG/L implementation), so the first four (4) or so terms of the asymptotic polynomial expansion for 'epr' will be sufficient to achieve the desired precision.

The PowerPC processor defines a 'floating point multiply-add' instruction, which computes 'a*b+c' for 53-bit-precise arguments and returns a 53-bit-precise result. Using the 'floating-point multiply-add instruction' present in the IBM PowerPC and similar processors, the intermediate arithmetic calculation of 'a*b' is carried to 106 bits of precision. This gives extended precision for cases where 'a*b' and 'c' are nearly equal in magnitude but of opposite sign. In the case of the 'square root' function and the 'reciprocal function', this instruction can provide good accuracy in approximating the solutions for the equations 'x*x-a=0' and 'a*x-1=0'. The merged multiply-add with a result near 0 is apparent from the formulation, and is exploited to bring the results to full 53-bit precision.

In determining the 'reciprocal square root' of a number, the Newton-Raphson method uses two multiplications and an addition. PowerPC rounds the result of this first multiplication to 53 bits of precision, which upsets the precision of the final result. As a consequence, in approximately 30% of the cases, successive Newton-Raphson iterations fail to converge upon the correct result, instead oscillating between a number greater than the correct result and lower then the correct result. Further, when using the Taylor Expansion, this rounding off to 53 bits of precision results in an error term 'e' that is insufficient to correct the approximation error, thus in 20% of the cases, the Taylor Expansion fails to provide a desired result.

Figure 3:
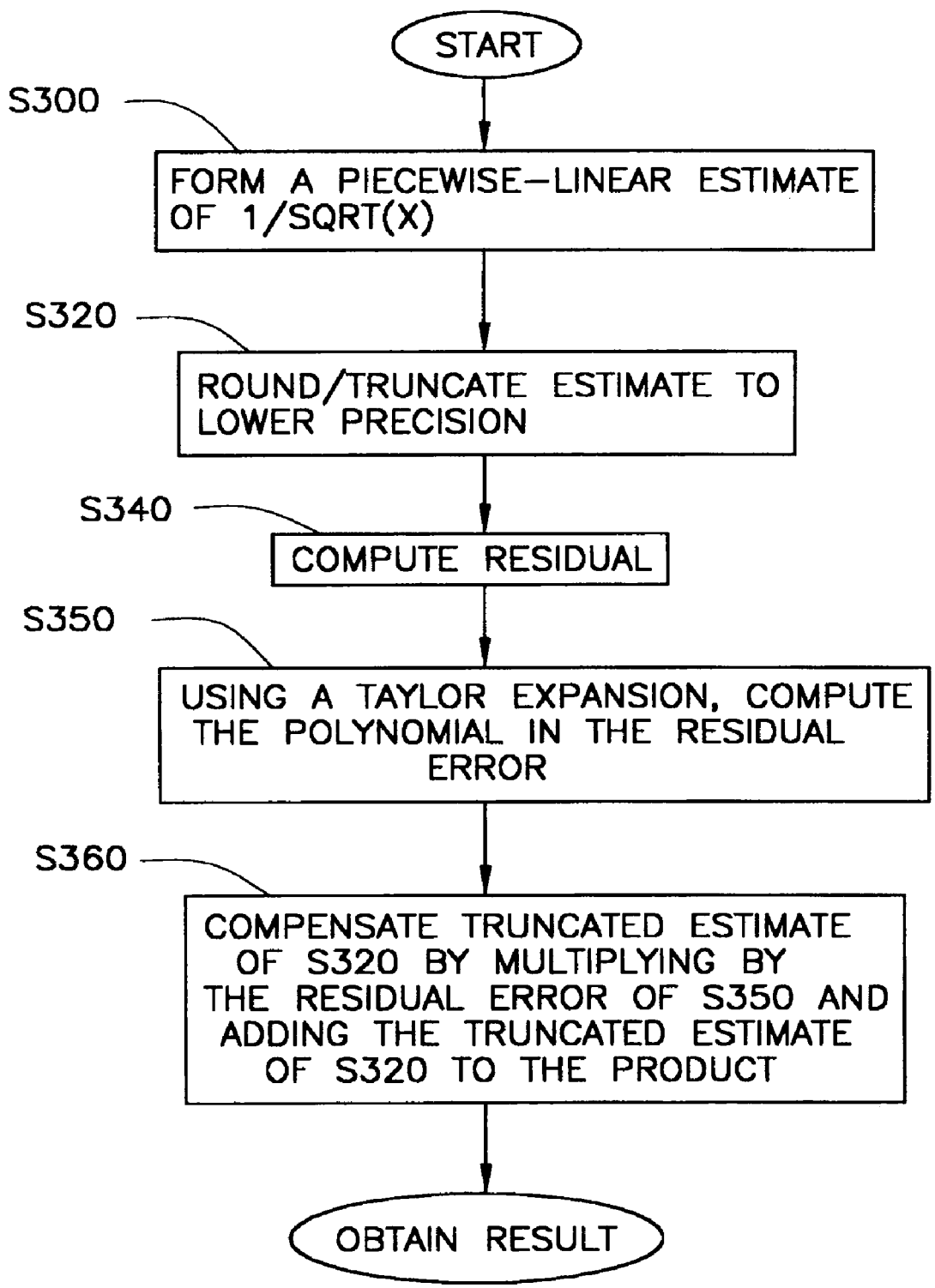
FIG. 3 is a flow diagram of a process involving the determination of the reciprocal square root in conformity with the present invention.

Referring now to FIG. 3, the process for calculating the reciprocal square root of a number in accordance with the present invention is depicted. As was earlier described in S100 through S130 of FIG. 1, and as further illustrated in FIG. 2, the process depicted in FIG. 3 begins by forming a piecewise-linear estimate. At S300, a piecewise-linear estimate for the reciprocal of the square root of 'x' is formed by multiplying x by a power 4 into a range of 1<=x<4. The top 5 bits of the mantissa are used to index one of two pairs of 32-element tables where the pairs are slope 'm' and offset 'c'. It will be appreciated that more or less than the top 5 bits of the mantissa may be used depending on the microprocessor's precision. The values for 'm' and 'c' are looked up in the appropriate table depending on whether 1<=x<2 or 2<=x<4. Next, in S320, the estimate is rounded/truncated to one half of the microprocessor's precision or less than one half. It will be appreciated that in one preferred embodiment of the invention the rounding/truncating of step S320 may be performed to a least one half of the microprocessor's precision, but, in many cases may be performed to less than one half. In S340, the residual is computed by so that the rounded/truncated estimate is multiplied by itself and the result is then multiplied by the argument 'x' and 1.0 is subtracted from the product to obtain the residual error. In S350, the polynomial in the residual error is computed by using a Taylor Expansion where the argument value is the residual error calculated in S340. In S360 the original rounded estimate of S320 is compensated by adding the extended precision intermediate product (residual error) of S350 to the original estimate of S320. In 99.9994% of the time, the result is the IEEE-representable (53-bit) number nearest the infinite precision value for the reciprocal square root of 'x'. In the other 0.0006% of the time, the result is the IEEE-representable (53-bit) number nearest the infinite precision value for the reciprocal square root of 'x' but incorrectly rounded in the least significant bit.

Figure 4:
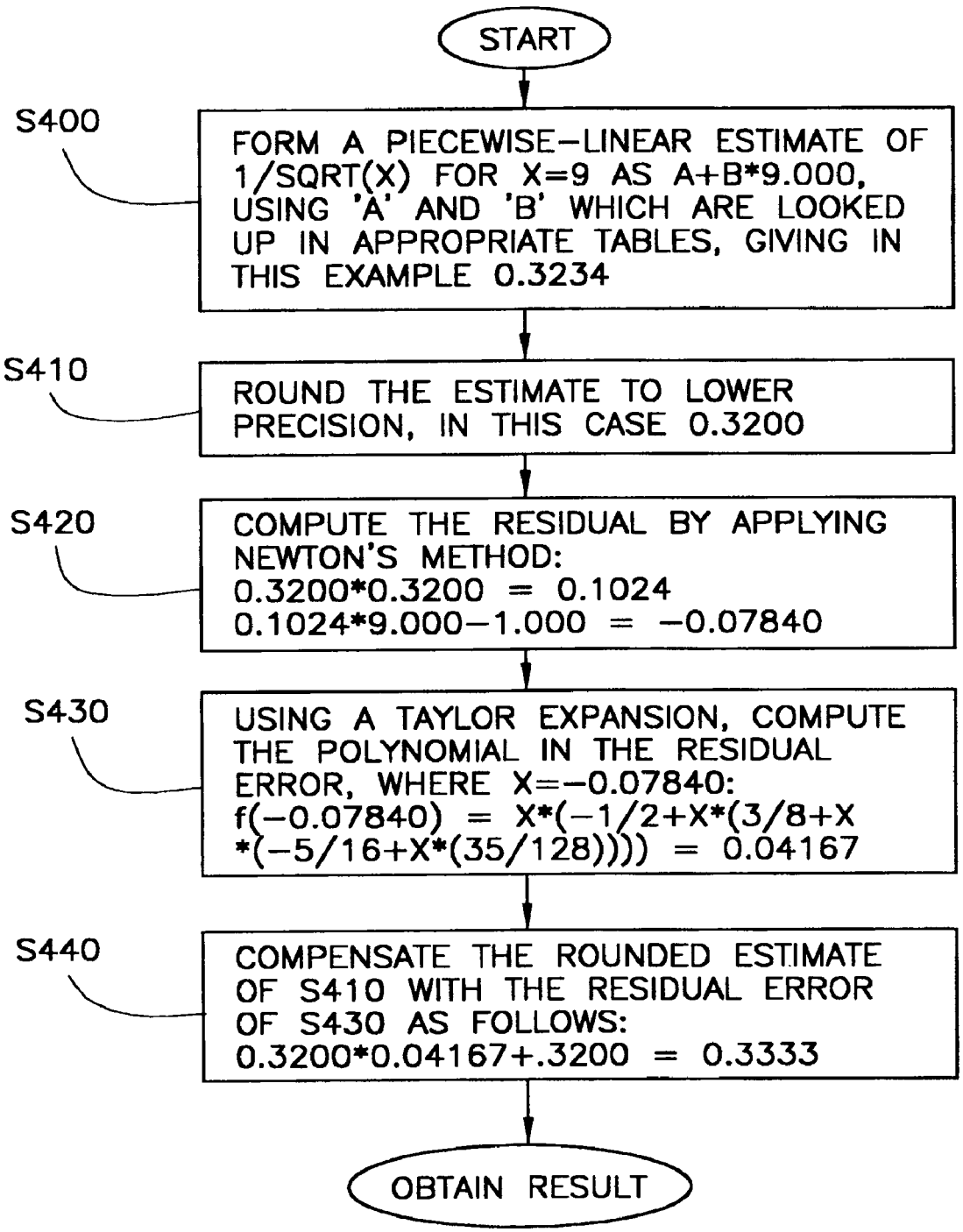
FIG. 4 is a more particular flow diagram of a process involving the determination of the reciprocal square root of 9 in conformity with the present invention.

Moving on to FIG. 4, the process for estimating the reciprocal square root of 9 is depicted in accordance with the present invention, assuming a base-10 number system. It should be appreciated that the invention is applicable to any number of bases including binary and hexadecimal numbers. First, at S400, a piecewise-linear estimate for the reciprocal square root of 9 is obtained by finding the values for A and B using the equation A+B*9. In the example, the value is 0.3234. Next, at S410, this value is then rounded to two decimal places to obtain a new estimate of 0.32. At S420, the calculation is as follows: 0.3200×0.3200=0.1024, 0.1024× 9.000−1.000=−0.07840. At S430, a Taylor Expansion is performed and the polynomial in the residual of −0.07840 is calculated to the desired number of terms as follows, using the polynomial equation $f(x)=x*(-\frac{1}{2}+x*(-\frac{5}{16}+x*\frac{35}{128})))$ where x=−0.07840, f(−0.07840)=0.04167. At S440, the result of the Taylor Expansion is used to compensate the original rounded piecewise-linear estimation as follows: 0.3200*0.04167+0.3200=0.3333.

As can be seen from the above discussion, it is apparent that by rounding off the estimate to half the processor's floating point precision or less than half that precision, the 'multiply' operation used to square the rounded estimate is exact in that all the bits that would nominally be dropped when the machine rounds the result are zeroes. This results in a more accurate error factor 'e' and provides a more accurate end result.

Thus, in 99.9994% of test cases, the present invention results in a desired result. In the remaining 0.0006%, there is a rounding error in the last significant bit. It will be appreciated that the invention results in a significant improvement over the 70% accuracy provided by the Newton-Raphson Method and the 80% accuracy of the Taylor Expansion without rounding.

Figure 5:
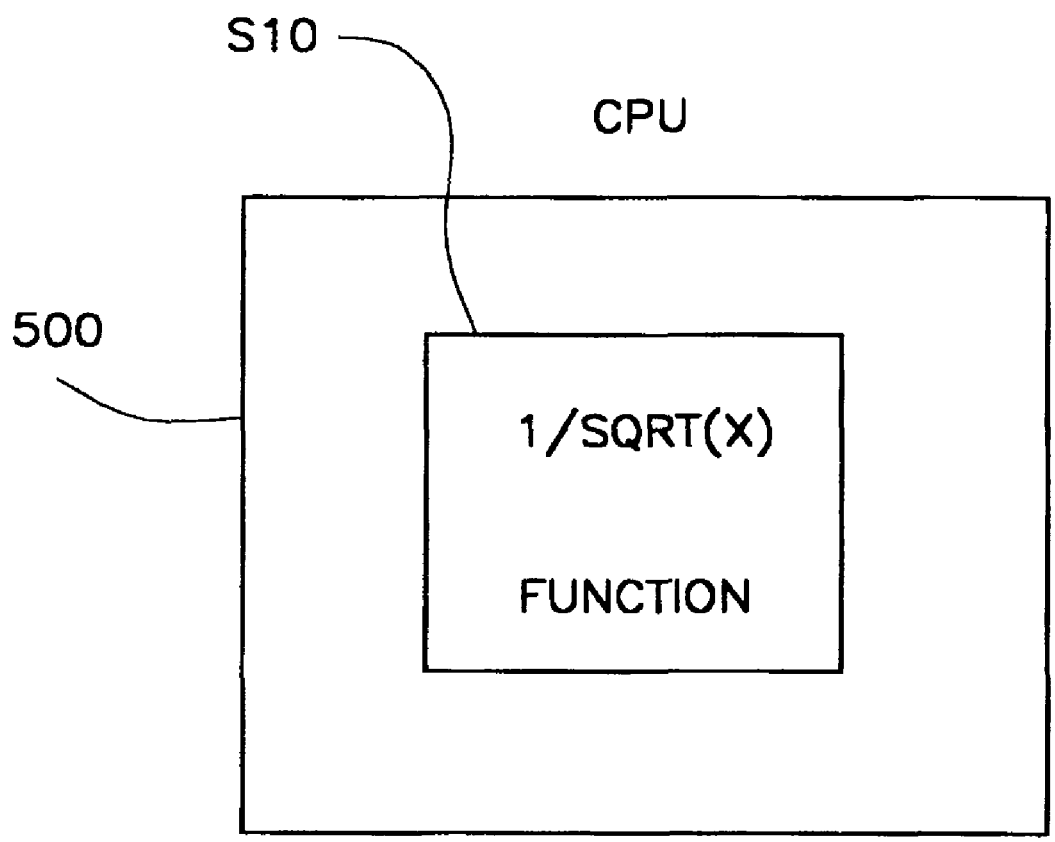
FIG. 5 depicts a microprocessor suitable for implementing the process of determining the reciprocal square root in conformity with the present invention.

Finally, FIG. 5 depicts a microprocessor suitable for implementing the process of determining the reciprocal square root in conformity with the present invention. At 500, the microprocessor is depicted. At 510, the processor function for calculating the reciprocal square root of a number in conformity with the present invention is depicted. In one preferred embodiment of the invention, the microprocessor will be capable of performing calculations with up to 106 bits of precision. However, it will be appreciated that the invention herein is applicable to microprocessors having more or less than the 106 bits of precision assumed herein.

Set forth in the Appendix hereto is a compiler listing, which includes source code written in the C computer language that a programmer would use to instruct a microprocessor or computer to evaluate the reciprocal square root of a number, a timing section timing section which shows how many clock cycles the compiler estimate the program will take, and the sequence of machine instructions to implement the code. The material in the Appendix illustrates how the present invention may be utilized.

It is to be understood that the present invention, in accordance with at least one preferred embodiment, includes an arrangement for forming a piecewise-linear estimate for the reciprocal square root of a number; an arrangement for rounding said estimate to a lower precision; an arrangement for computing the residual of said rounded estimate; an arrangement for using a Taylor Expansion to compute the polynomial in said residual of said estimate to obtain the residual error; and an arrangement for multiplying said rounded estimate by said residual error and adding the result to said rounded estimate. Together these elements may be implemented on at least one general-purpose computer running suitable software programs. These may be implemented on at least one Integrated Circuit or part of at least one Integrated Circuit. Thus, it is to be understood that the invention may be implemented on hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

APPENDIX

VisualAge C++ for Linux on pSeries, Version 6.0.0.0 --- tenrootc.c
07/30/2003 11:41:05 AM (C)
>>>>> SOURCE SECTION <<<<<

```
 1 | #include <math.h>
 2 | double reciprocal_square_root(double x)
 3 | {
 4 |    return 1.0/sqrt(x) ;
 5 | }
 6 |
 7 | void ten_reciprocal_square_root(double* f, const double* x)
 8 | {
 9 |    double x0 = x[0] ;
10 |    double x1 = x[1] ;
11 |    double x2 = x[2] ;
12 |    double x3 = x[3] ;
13 |    double x4 = x[4] ;
14 |    double x5 = x[5] ;
15 |    double x6 = x[6] ;
16 |    double x7 = x[7] ;
17 |    double x8 = x[8] ;
18 |    double x9 = x[9] ;
19 |    double r0 = 1.0/sqrt(x0) ;
20 |    double r1 = 1.0/sqrt(x1) ;
21 |    double r2 = 1.0/sqrt(x2) ;
22 |    double r3 = 1.0/sqrt(x3) ;
23 |    double r4 = 1.0/sqrt(x4) ;
24 |    double r5 = 1.0/sqrt(x5) ;
25 |    double r6 = 1.0/sqrt(x6) ;
26 |    double r7 = 1.0/sqrt(x7) ;
27 |    double r8 = 1.0/sqrt(x8) ;
28 |    double r9 = 1.0/sqrt(x9) ;
29 |    f[0] = r0 ;
30 |    f[1] = r1 ;
31 |    f[2] = r2 ;
32 |    f[3] = r3 ;
33 |    f[4] = r4 ;
34 |    f[5] = r5 ;
35 |    f[6] = r6 ;
36 |    f[7] = r7 ;
37 |    f[8] = r8 ;
38 |    f[9] = r9 ;
39 | }
40 |
```

APPENDIX-continued

```
        41 |
** Procedure List for Proc # 1: ten_reciprocal_square_root End of
Phase 3 **
    0:   HDR
    4:   BB_BEGIN      2 /      0
    0:   PROC          f,x,gr3,gr4
    0:   DIRCTIV       issue_cycle,0
    0:   LR            gr12=gr1
    0:   LI            gr0=-16
    0:   DIRCTIV       issue_cycle,1
    0:   ST4U          gr1,#stack(gr1,-80)=gr1
    0:   DIRCTIV       issue_cycle,2
    0:   SFPLU         gr12,#stack(gr12,gr0,0)=fp31,fp63
    0:   DIRCTIV       issue_cycle,3
    0:   SFPLU         gr12,#stack(gr12,gr0,0)=fp30,fp62
    0:   DIRCTIV       issue_cycle,4
    0:   SFPLU         gr12,#stack(gr12,gr0,0)=fp29,fp61
    0:   DIRCTIV       issue_cycle,5
    0:   SFPLU         gr12,#stack(gr12,gr0,0)=fp28,fp60
    0:   FENCE
    0:   DIRCTIV       end_prologue
    0:   FENCE
    0:   DIRCTIV       issue_cycle,0
   39:   DIRCTIV       start_epilogue
   18:   LI            gr6=72
   17:   LFL           fp13=(*)Cdouble(gr4,64)
    0:   DIRCTIV       issue_cycle,1
   16:   LI            gr7=56
   18:   LFL           fp45=(*)Cdouble(gr4,gr6,0,trap=72)
    0:   DIRCTIV       issue_cycle,2
   14:   LI            gr5=40
   15:   LFL           fp3=(*)Cdouble(gr4,48)
    0:   DIRCTIV       issue_cycle,3
   16:   LFL           fp35=(*)Cdouble(gr4,gr7,0,trap=56)
   12:   LI            gr6=24
    0:   DIRCTIV       issue_cycle,4
   19:   LA            gr8=.+CONSTANT_AREA%HI(gr2,0)
   13:   LFL           fp1=(*)Cdouble(gr4,32)
    0:   DIRCTIV       issue_cycle,5
   14:   LFL           fp33=(*)Cdouble(gr4,gr5,0,trap=40)
   27:   FPRSQRE       fp12,fp44=fp13,fp45
    0:   DIRCTIV       issue_cycle,6
   11:   LFL           fp31=(*)Cdouble(gr4,16)
   10:   LI            gr7=8
    0:   DIRCTIV       issue_cycle,7
   25:   FPRSQRE       fp11,fp43=fp3,fp35
   12:   LFL           fp63=(*)Cdouble(gr4,gr6,0,trap=24)
    0:   DIRCTIV       issue_cycle,8
   19:   LA            gr9=+CONSTANT_AREA%LO(gr8,0)
    9:   LFL           fp10=(*)Cdouble(gr4,0)
    0:   DIRCTIV       issue_cycle,9
   23:   FPRSQRE       fp9,fp41=fp1,fp33
   10:   LFL           fp42=(*)Cdouble(gr4,gr7,0,trap=8)
    0:   DIRCTIV       issue_cycle,10
   27:   FPMUL         fp4,fp36=fp12,fp44,fp12,fp44,fcr
   19:   LFPS          fp8,fp40=+CONSTANT_AREA(gr9,gr6,0,trap=24)
    0:   DIRCTIV       issue_cycle,11
   19:   LI            gr8=32
   21:   FPRSQRE       fp7,fp39=fp31,fp63
    0:   DIRCTIV       issue_cycle,12
   25:   FPMUL         fp2,fp34=fp11,fp43,fp11,fp43,fcr
   19:   LFS           fp30=+CONSTANT_AREA(gr9,4)
    0:   DIRCTIV       issue_cycle,13
   19:   FPRSQRE       fp6,fp38=fp10,fp42
   19:   LFPS          fp29,fp61=+CONSTANT_AREA(gr9,gr8,0,trap=32)
    0:   DIRCTIV       issue_cycle,14
   23:   FPMUL         fp0,fp32=fp9,fp41,fp9,fp41,fcr
   19:   LFPS          fp28,fp60=+CONSTANT_AREA(gr9,gr5,0,trap=40)
    0:   DIRCTIV       issue_cycle,15
   19:   LI            gr4=48
   27:   FPMADD        fp4,fp36=fp8,fp40,fp13,fp45,fp4,fp36,fcr
    0:   DIRCTIV       issue_cycle,16
   19:   LFPS          fp5,fp37=+CONSTANT_AREA(gr9,gr4,0,trap=48)
   21:   FPMUL         fp13,fp45=fp7,fp39,fp7,fp39,fcr
    0:   DIRCTIV       issue_cycle,17
   25:   FPMADD        fp3,fp35=fp8,fp40,fp3,fp35,fp2,fp34,fcr
   38:   LI            gr6=72
    0:   DIRCTIV       issue_cycle,18
   19:   FPMUL         fp2,fp34=fp6,fp38,fp6,fp38,fcr
   39:   LI            gr0=16
```

APPENDIX-continued

```
  0:   DIRCTIV    issue_cycle,19
 23:   FPMADD     fp1,fp33=fp8,fp40,fp1,fp33,fp0,fp32,fcr
 39:   LR         gr12=gr1
  0:   DIRCTIV    issue_cycle,20
 27:   FXPMADD    fp0,fp32=fp29,fp61,fp4,fp36,fp30,fp30,fcr
 36:   LI         gr7=56
  0:   DIRCTIV    issue_cycle,21
 21:   FPMADD     fp31,fp63=fp8,fp40,fp31,fp63,fp13,fp45,fcr
  0:   DIRCTIV    issue_cycle,22
 25:   FXPMADD    fp13,fp45=fp29,fp61,fp3,fp35,fp30,fp30,fcr
  0:   DIRCTIV    issue_cycle,23
 19:   FPMADD     fp8,fp40=fp8,fp40,fp10,fp42,fp2,fp34,fcr
  0:   DIRCTIV    issue_cycle,24
 23:   FXPMADD    fp2,fp34=fp29,fp61,fp1,fp33,fp30,fp30,fcr
  0:   DIRCTIV    issue_cycle,25
 27:   FPMADD     fp10,fp42=fp28,fp60,fp4,fp36,fp0,fp32,fcr
  0:   DIRCTIV    issue_cycle,26
 21:   FXPMADD    fp0,fp32=fp29,fp61,fp31,fp63,fp30,fp30,fcr
  0:   DIRCTIV    issue_cycle,27
 25:   FPMADD     fp13,fp45=fp28,fp60,fp3,fp35,fp13,fp45,fcr
  0:   DIRCTIV    issue_cycle,28
 19:   FXPMADD    fp30,fp62=fp29,fp61,fp8,fp40,fp30,fp30,fcr
  0:   DIRCTIV    issue_cycle,29
 23:   FPMADD     fp2,fp34=fp28,fp60,fp1,fp33,fp2,fp34,fcr
  0:   DIRCTIV    issue_cycle,30
 27:   FPMADD     fp10,fp42=fp5,fp37,fp4,fp36,fp10,fp42,fcr
  0:   DIRCTIV    issue_cycle,31
 21:   FPMADD     fp0,fp32=fp28,fp60,fp31,fp63,fp0,fp32,fcr
  0:   DIRCTIV    issue_cycle,32
 25:   FPMADD     fp13,fp45=fp5,fp37,fp3,fp35,fp13,fp45,fcr
  0:   DIRCTIV    issue_cycle,33
 19:   FPMADD     fp30,fp62=fp28,fp60,fp8,fp40,fp30,fp62,fcr
  0:   DIRCTIV    issue_cycle,34
 23:   FPMADD     fp2,fp34=fp5,fp37,fp1,fp33,fp2,fp34,fcr
  0:   DIRCTIV    issue_cycle,35
 27:   FPMUL      fp4,fp36=fp4,fp36,fp10,fp42,fcr
 39:   LFPLU      fp28,fp60,gr12=#stack(gr12,gr0,0)
  0:   DIRCTIV    issue_cycle,36
 21:   FPMADD     fp0,fp32=fp5,fp37,fp31,fp63,fp0,fp32,fcr
 39:   LFPLU      fp29,fp61,gr12=#stack(gr12,gr0,0)
  0:   DIRCTIV    issue_cycle,37
 25:   FPMUL      fp3,fp35=fp3,fp35,fp13,fp45,fcr
  0:   DIRCTIV    issue_cycle,38
 19:   FPMADD     fp5,fp37=fp5,fp37,fp8,fp40,fp30,fp62,fcr
  0:   DIRCTIV    issue_cycle,39
 23:   FPMUL      fp1,fp33=fp1,fp33,fp2,fp34,fcr
  0:   DIRCTIV    issue_cycle,40
 27:   FPMADD     fp2,fp34=fp12,fp44,fp12,fp44,fp4,fp36,fcr
 39:   LFPLU      fp30,fp62,gr12=#stack(gr12,gr0,0)
  0:   DIRCTIV    issue_cycle,41
 21:   FPMUL      fp0,fp32=fp31,fp63,fp0,fp32,fcr
  0:   DIRCTIV    issue_cycle,42
 25:   FPMADD     fp3,fp35=fp11,fp43,fp11,fp43,fp3,fp35,fcr
  0:   DIRCTIV    issue_cycle,43
 19:   FPMUL      fp4,fp36=fp8,fp40,fp5,fp37,fcr
 39:   LFPLU      fp31,fp63,gr12=#stack(gr12,gr0,0)
  0:   DIRCTIV    issue_cycle,44
 23:   FPMADD     fp1,fp33=fp9,fp41,fp9,fp41,fp1,fp33,fcr
 39:   AI         gr1=gr1,80,gr12
  0:   DIRCTIV    issue_cycle,45
 39:   CONSUME    gr1,gr2,lr,gr14-gr31,fp14-fp31,fp46-
fp63,cr[234],fsr,fcr,ctr
 38:   STFL       (*)double(gr3,gr6,0,trap=72)=fp34
 32:   LI         gr6=24
  0:   DIRCTIV    issue_cycle,46
 21:   FPMADD     fp0,fp32=fp7,fp39,fp7,fp39,fp0,fp32,fcr
 37:   STFL       (*)double(gr3,64)=fp2
  0:   DIRCTIV    issue_cycle,47
 36:   STFL       (*)double(gr3,gr7,0,trap=56)=fp35
 30:   LI         gr7=8
  0:   DIRCTIV    issue_cycle,48
 35:   STFL       (*)double(gr3,48)=fp3
  0:   DIRCTIV    issue_cycle,49
 19:   FPMADD     fp2,fp34=fp6,fp38,fp6,fp38,fp4,fp36,fcr
 34:   STFL       (*)double(gr3,gr5,0,trap=40)=fp33
  0:   DIRCTIV    issue_cycle,50
 33:   STFL       (*)double(gr3,32)=fp1
  0:   DIRCTIV    issue_cycle,51
 32:   STFL       (*)double(gr3,gr6,0,trap=24)=fp32
  0:   DIRCTIV    issue_cycle,52
```

APPENDIX-continued

```
31:     STFL       (*)double(gr3,16)=fp0
 0:     DIRCTIV    issue_cycle,54
30:     STFL       (*)double(gr3,gr7,0,trap=8)=fp34
 0:     DIRCTIV    issue_cycle,55
29:     STFL       (*)double(gr3,0)=fp2
39:     BA lr
 4:     BB_END
 5:     BB_BEGIN    3 /     0
39:     PEND
 5:     BB_END
```
 End of Procedure List for Proc #    1: ten_reciprocal_square_root End of Phase 3 
 Procedure List for Proc #    2: reciprocal_square_root End of Phase 3 
```
 0:     HDR
 4:     BB_BEGIN    2 /     0
 0:     PROC       x,fp1
 0:     FENCE
 0:     DIRCTIV    end_prologue
 0:     FENCE
 0:     DIRCTIV    issue_cycle,0
 5:     DIRCTIV    start_epilogue
 4:     FRSQRE     fp0=fp1
 4:     LA         gr3=.+CONSTANT_AREA%HI(gr2,0)
 0:     DIRCTIV    issue_cycle,1
 4:     LA         gr3=+CONSTANT_AREA%LO(gr3,0)
 0:     DIRCTIV    issue_cycle,2
 4:     LFS        fp2=+CONSTANT_AREA(gr3,0)
 0:     DIRCTIV    issue_cycle,3
 4:     LFS        fp4=+CONSTANT_AREA(gr3,4)
 0:     DIRCTIV    issue_cycle,4
 4:     LFS        fp3=+CONSTANT_AREA(gr3,8)
 0:     DIRCTIV    issue_cycle,5
 4:     MFL        fp5=fp0,fcr
 4:     LFS        fp6=+CONSTANT_AREA(gr3,12)
 0:     DIRCTIV    issue_cycle,6
 4:     LFS        fp7=+CONSTANT_AREA(gr3,16)
 0:     DIRCTIV    issue_cycle,10
 4:     FMA        fp1=fp2,fp1,fp5,fcr
 0:     DIRCTIV    issue_cycle,15
 4:     FMA        fp2=fp3,fp1,fp4,fcr
 0:     DIRCTIV    issue_cycle,20
 4:     FMA        fp2=fp6,fp1,fp2,fcr
 0:     DIRCTIV    issue_cycle,25
 4:     FMA        fp2=fp7,fp1,fp2,fcr
 0:     DIRCTIV    issue_cycle,30
 4:     MFL        fp1=fp1,fp2,fcr
 0:     DIRCTIV    issue_cycle,35
 4:     FMA        fp1=fp0,fp0,fp1,fcr
 0:     DIRCTIV    issue_cycle,36
 5:     CONSUME    gr1,gr2,lr,gr14-gr31,fp1,fp14-fp31,fp46-fp63,cr[234],fsr,fcr,ctr
 5:     BA         lr
 4:     BB_END
 5:     BB_BEGIN    3 /     0
 5:     PEND
 5:     BB_END
```
 End of Procedure List for Proc #    2: reciprocal_square_root End of Phase 3 
```
GPR's set/used:    ssuu ssss ss-- s--- ---- ---- ---- ----
FPR's set/used:    ssss ssss ssss ss-- ---- ---- ---- ssss
                   ssss ssss ssss ss-- ---- ---- ---- ssss
CCR's set/used:    ---- ----
    | 000000                         PDEF    ten_reciprocal_square_root
    0|                               PROC    f,x,gr3,gr4
    0| 000000 ori      602C0000  1   LR      gr12=gr1
    0| 000004 addi     3800FFF0  1   LI      gr0=-16
    0| 000008 stwu     9421FFB0  1   ST4U    gr1,#stack(gr1,-80)=gr1
    0| 00000C stfpdux  7FEC07DC  1   SFPLU   gr12,#stack(gr12,gr0,0)=fp31,fp63
    0| 000010 stfpdux  7FCC07DC  1   SFPLU   gr12,#stack(gr12,gr0,0)=fp30,fp62
    0| 000014 stfpdux  7FAC07DC  1   SFPLU   gr12,#stack(gr12,gr0,0)=fp29,fp61
    0| 000018 stfpdux  7F8C07DC  1   SFPLU
```

APPENDIX-continued

```
gr12,#stack(gr12,gr0,0)=fp28,fp60
    18| 00001C addi         38C00048   1  LI       gr6=72
    17| 000020 lfd          C9A40040   1  LFL      fp13=(*)Cdouble(gr4,64)
    16| 000024 addi         38E00038   1  LI       gr7=56
    18| 000028 lfsdx        7DA4319C   1  LFL
fp45=(*)Cdouble(gr4,gr6,0,trap=72)
    14| 00002C addi         38A00028   1  LI       gr5=40
    15| 000030 lfd          C8640030   1  LFL      fp3=(*)Cdouble(gr4,48)
    16| 000034 lfsdx        7C64399C   1  LFL
fp35=(*)Cdouble(gr4,gr7,0,trap=56)
    12| 000038 addi         38C00018   1  LI       gr6=24
    19| 00003C addis        3D000000   1  LA
gr8=.+CONSTANT_AREA%HI(gr2,0)
    13| 000040 lfd          C8240020   1  LFL      fp1=(*)Cdouble(gr4,32)
    14| 000044 lfsdx        7C24299C   1  LFL
fp33=(*)Cdouble(gr4,gr5,0,trap=40)
    27| 000048 fprsqrte     0180681E   1  FPRSQRE  fp12,fp44=fp13,fp45
    11| 00004C lfd          CBE40010   1  LFL      fp31=(*)Cdouble(gr4,16)
    10| 000050 addi         38E00008   1  LI       gr7=8
    25| 000054 fprsqrte     0160181E   1  FPRSQRE  fp11,fp43=fp3,fp35
    12| 000058 lfsdx        7FE4319C   1  LFL
fp63=(*)Cdouble(gr4,gr6,0,trap=24)
    19| 00005C addi         39280000   1  LA
gr9=+CONSTANT_AREA%LO(gr8,0)
     9| 000060 lfd          C9440000   1  LFL      fp10=(*)Cdouble(gr4,0)
    23| 000064 fprsqrte     0120081E   1  FPRSQRE  fp9,fp41=fp1,fp33
    10| 000068 lfsdx        7D44399C   1  LFL
fp42=(*)Cdouble(gr4,gr7,0,trap=8)
    27| 00006C fpmul        008C0310   1  FPMUL
fp4,fp36=fp12,fp44,fp12,fp44,fcr
    19| 000070 lfpsx        7D09331C   1  LFPS
fp8,fp40=+CONSTANT_AREA(gr9,gr6,0,trap=24)
    19| 000074 addi         39000020   1  LI       gr8=32
    21| 000078 fprsqrte     00E0F81E   1  FPRSQRE  fp7,fp39=fp31,fp63
    25| 00007C fpmul        004B02D0   1  FPMUL
fp2,fp34=fp11,fp43,fp11,fp43,fcr
    19| 000080 lfs          C3C90004   1  LFS
fp30=+CONSTANT_AREA(gr9,4)
    19| 000084 fprsqrte     00C0501E   1  FPRSQRE  fp6,fp38=fp10,fp42
    19| 000088 lfpsx        7FA9431C   1  LFPS
fp29,fp61=+CONSTANT_AREA(gr9,gr8,0,trap=32)
    23| 00008C fpmul        00090250   1  FPMUL
fp0,fp32=fp9,fp41,fp9,fp41,fcr
    19| 000090 lfpsx        7F892B1C   1  LFPS
fp28,fp60=+CONSTANT_AREA(gr9,gr5,0,trap=40)
    19| 000094 addi         38800030   1  LI       gr4=48
    27| 000098 fpmadd       008D4120   1  FPMADD
fp4,fp36=fp8,fp40,fp13,fp45,fp4,fp36,fcr
    19| 00009C lfpsx        7CA9231C   1  LFPS
fp5,fp37=+CONSTANT_AREA(gr9,gr4,0,trap=48)
    21| 0000A0 fpmul        01A701D0   1  FPMUL
fp13,fp45=fp7,fp39,fp7,fp39,fcr
    25| 0000A4 fpmadd       006340A0   1  FPMADD
fp3,fp35=fp8,fp40,fp3,fp35,fp2,fp34,fcr
    38| 0000A8 addi         38C00048   1  LI       gr6=72
    19| 0000AC fpmul        00460190   1  FPMUL
fp2,fp34=fp6,fp38,fp6,fp38,fcr
    39| 0000B0 addi         38000010   1  LI       gr0=16
    23| 0000B4 fpmadd       00214020   1  FPMADD
fp1,fp33=fp8,fp40,fp1,fp33,fp0,fp32,fcr
    39| 0000B8 ori          602C0000   1  LR       gr12=gr1
    27| 0000BC fxcpmadd     001EE924   1  FXPMADD
fp0,fp32=fp29,fp61,fp4,fp36,fp30,fp30,fcr
    36| 0000C0 addi         38E00038   1  LI       gr7=56
    21| 0000C4 fpmadd       03FF4360   1  FPMADD
fp31,fp63=fp8,fp40,fp31,fp63,fp13,fp45,fcr
    25| 0000C8 fxcpmadd     01BEE8E4   1  FXPMADD
fp13,fp45=fp29,fp61,fp3,fp35,fp30,fp30,fcr
    19| 0000CC fpmadd       010A40A0   1  FPMADD
fp8,fp40=fp8,fp40,fp10,fp42,fp2,fp34,fcr
    23| 0000D0 fxcpmadd     005EE864   1  FXPMADD
fp2,fp34=fp29,fp61,fp1,fp33,fp30,fp30,fcr
    27| 0000D4 fpmadd       0144E020   1  FPMADD
fp10,fp42=fp28,fp60,fp4,fp36,fp0,fp32,fcr
    21| 0000D8 fxcpmadd     001EEFE4   1  FXPMADD
fp0,fp32=fp29,fp61,fp31,fp63,fp30,fp30,fcr
    25| 0000DC fpmadd       01A3E360   1  FPMADD
fp13,fp45=fp28,fp60,fp3,fp35,fp13,fp45,fcr
    19| 0000E0 fxcpmadd     03DEEA24   1  FXPMADD
```

APPENDIX-continued

```
     fp30,fp62=fp29,fp61,fp8,fp40,fp30,fp30,fcr
  23| 0000E4 fpmadd      0041E0A0   1   FPMADD
     fp2,fp34=fp28,fp60,fp1,fp33,fp2,fp34,fcr
  27| 0000E8 fpmadd      01442AA0   1   FPMADD
     fp10,fp42=fp5,fp37,fp4,fp36,fp10,fp42,fcr
  21| 0000EC fpmadd      001FE020   1   FPMADD
     fp0,fp32=fp28,fp60,fp31,fp63,fp0,fp32,fcr
  25| 0000F0 fpmadd      01A32B60   1   FPMADD
     fp13,fp45=fp5,fp37,fp3,fp35,fp13,fp45,fcr
  19| 0000F4 fpmadd      03C8E7A0   1   FPMADD
     fp30,fp62=fp28,fp60,fp8,fp40,fp30,fp62,fcr
  23| 0000F8 fpmadd      004128A0   1   FPMADD
     fp2,fp34=fp5,fp37,fp1,fp33,fp2,fp34,fcr
  27| 0000FC fpmul       00840290   1   FPMUL
     fp4,fp36=fp4,fp36,fp10,fp42,fcr
  39| 000100 lfpdux      7F8C03DC   1   LFPLU
     fp28,fp60,gr12=#stack(gr12,gr0,0)
  21| 000104 fpmadd      001F2820   1   FPMADD
     fp0,fp32=fp5,fp37,fp31,fp63,fp0,fp32,fcr
  39| 000108 lfpdux      7FAC03DC   1   LFPLU
     fp29,fp61,gr12=#stack(gr12,gr0,0)
  25| 00010C fpmul       00630350   1   FPMUL
     fp3,fp35=fp3,fp35,fp13,fp45,fcr
  19| 000110 fpmadd      00A82FA0   1   FPMADD
     fp5,fp37=fp5,fp37,fp8,fp40,fp30,fp62,fcr
  23| 000114 fpmul       00210090   1   FPMUL
     fp1,fp33=fp1,fp33,fp2,fp34,fcr
  27| 000118 fpmadd      004C6120   1   FPMADD
     fp2,fp34=fp12,fp44,fp12,fp44,fp4,fp36,fcr
  39| 00011C lfpdux      7FCC03DC   1   LFPLU
     fp30,fp62,gr12=#stack(gr12,gr0,0)
  21| 000120 fpmul       001F0010   1   FPMUL
     fp0,fp32=fp31,fp63,fp0,fp32,fcr
  25| 000124 fpmadd      006B58E0   1   FPMADD
     fp3,fp35=fp11,fp43,fp11,fp43,fp3,fp35,fcr
  19| 000128 fpmul       00880150   1   FPMUL
     fp4,fp36=fp8,fp40,fp5,fp37,fcr
  39| 00012C lfpdux      7FEC03DC   1   LFPLU
     fp31,fp63,gr12=#stack(gr12,gr0,0)
  23| 000130 fpmadd      00294860   1   FPMADD
     fp1,fp33=fp9,fp41,fp9,fp41,fp1,fp33,fcr
  39| 000134 addi        38210050   1   AI       gr1=gr1,80,gr12
  38| 000138 stfsdx      7C43359C   1   STFL
     (*)double(gr3,gr6,0,trap=72)=fp34
  32| 00013C addi        38C00018   1   LI       gr6=24
  21| 000140 fpmadd      00073820   1   FPMADD
     fp0,fp32=fp7,fp39,fp7,fp39,fp0,fp32,fcr
  37| 000144 stfd        D8430040   1   STFL     (*)double(gr3,64)=fp2
  36| 000148 stfsdx      7C633D9C   1   STFL
     (*)double(gr3,gr7,0,trap=56)=fp35
  30| 00014C addi        38E00008   1   LI       gr7=8
  35| 000150 stfd        D8630030   1   STFL     (*)double(gr3,48)=fp3
  19| 000154 fpmadd      00463120   1   FPMADD
     fp2,fp34=fp6,fp38,fp6,fp38,fp4,fp36,fcr
  34| 000158 stfsdx      7C232D9C   1   STFL
     (*)double(gr3,gr5,0,trap=40)=fp33
  33| 00015C stfd        D8230020   1   STFL     (*)double(gr3,32)=fp1
  32| 000160 stfsdx      7C03359C   1   STFL
     (*)double(gr3,gr6,0,trap=24)=fp32
  31| 000164 stfd        D8030010   1   STFL     (*)double(gr3,16)=fp0
  30| 000168 stfsdx      7C433D9C   1   STFL
     (*)double(gr3,gr7,0,trap=8)=fp34
  29| 00016C stfd        D8430000   1   STFL     (*)double(gr3,0)=fp2
  39| 000170 bclr        4E800020   0   BA       lr
    |                Instruction count           93
GPR's set/used:   --us ---- ---- ---- ---- ---- ----
FPR's set/used:   ssss ssss ---- ---- ---- ---- ----
                  ---- ---- ---- ---- ---- ---- ----
CCR's set/used:   ---- ----
   | 000000                                 PDEF  reciprocal_square_root
   0|                                       PROC  x,fp1
   4| 000174 frsqrte     FC000834   1   FRSQRE   fp0=fp1
   4| 000178 addis       3C600000   1   LA       gr3=.+CONSTANT_AREA%HI(gr2,0)
   4| 00017C addi        38630000   1   LA       gr3=+CONSTANT_AREA%LO(gr3,0)
   4| 000180 lfs         C0430000   1   LFS      fp2=+CONSTANT_AREA(gr3,0)
   4| 000184 lfs         C0830004   1   LFS
```

APPENDIX-continued

```
fp4=+CONSTANT_AREA(gr3,4)
    4| 000188 lfs          C0630008   1   LFS
fp3=+CONSTANT_AREA(gr3,8)
    4| 00018C fmul         FCA00032   1   MFL    fp5=fp0,fp0,fcr
    4| 000190 lfs          C0C3000C   1   LFS
fp6=+CONSTANT_AREA(gr3,12)
    4| 000194 lfs          C0E30010   1   LFS
fp7=+CONSTANT_AREA(gr3,16)
    4| 000198 fmadd        FC21117A   2   FMA    fp1=fp2,fp1,fp5,fcr
    4| 00019C fmadd        FC41193A   4   FMA    fp2=fp3,fp1,fp4,fcr
    4| 0001A0 fmadd        FC4130BA   4   FMA    fp2=fp6,fp1,fp2,fcr
    4| 0001A4 fmadd        FC4138BA   4   FMA    fp2=fp7,fp1,fp2,fcr
    4| 0001A8 fmul         FC2100B2   4   MFL    fp1=fp1,fp2,fcr
    4| 0001AC fmadd        FC20007A   4   FMA    fp1=fp0,fp0,fp1,fcr
    5| 0001B0 bclr         4E800020   0   BA lr
     |                     Instruction count 16
     |                     Constant Area
     | 000000             BF800000 3E8C0000 BEA00000 3EC00000 BF000000
49424D20
     | 000018             BF800000 BF800000 BEA00000 BEA00000 3EC00000
3EC00000
     | 000030             BF000000 BF000000
```

What is claimed is:

1. A method for calculating the reciprocal square root of a number in a computing device comprising a processor having an embedded program for executing a reciprocal square root estimate operation, the reciprocal square root estimate operation comprising the steps of:

using the processor to form a piecewise-linear estimate for the reciprocal square root of a number;

using the processor to round said estimate to a lower precision;

using the processor to compute the residual of said rounded estimate;

using the processor to utilize a Taylor Expansion to compute the polynomial in said residual of said estimate to obtain the residual error; and using the processor to multiply said rounded estimate by said residual error and adding the result to said rounded estimate.

2. The method of claim 1, said estimate is rounded to one half the number of digits sought for the final result.

3. The method of claim 1, wherein said estimate is rounded to less than one half of the number of digits sought for the final result.

4. An apparatus for calculating the reciprocal square root of a number, comprising:

one or more processors;

a memory in operative connection with the one or more processors;

wherein, responsive to execution of program instructions accessible to the one or more processors, the one or more processors are configured to:

form a piecewise-linear estimate for the reciprocal square root of a number;

round said estimate to a lower precision;

compute the residual of said rounded estimate;

use a Taylor Expansion to compute the polynomial in said residual of said estimate to obtain the residual error; and multiply said rounded estimate by said residual error and adding the result to said rounded estimate.

5. The apparatus of claim 4, wherein said estimate is rounded to one half the number of digits sought for the final result.

6. The apparatus of claim 4, wherein the said estimate is rounded to less than one half the number of digits sought for the final result.

7. A non-transitory program storage device readable by machine, tangibly embodying a program of instructions executable by the machine to perform a method for calculating the reciprocal square root of a number, comprising the steps of:

forming a piecewise-linear estimate for the reciprocal square root of a number;

rounding said estimate to a lower precision;

computing the residual of said rounded estimate;

using a Taylor Expansion to compute the polynomial in said residual of said estimate to obtain the residual error; and multiplying said rounded estimate by said residual error and adding the result to said rounded estimate.

8. The program storage device of claim 7, wherein said estimate is rounded to one half the number of digits sought for the final result.

9. The program storage device of claim 7, wherein said estimate is rounded to less than one half the number of digits sought for the final result.

* * * * *